May 5, 1931.  T. ROBINS  1,803,357
PULLEY
Filed Jan. 26, 1929
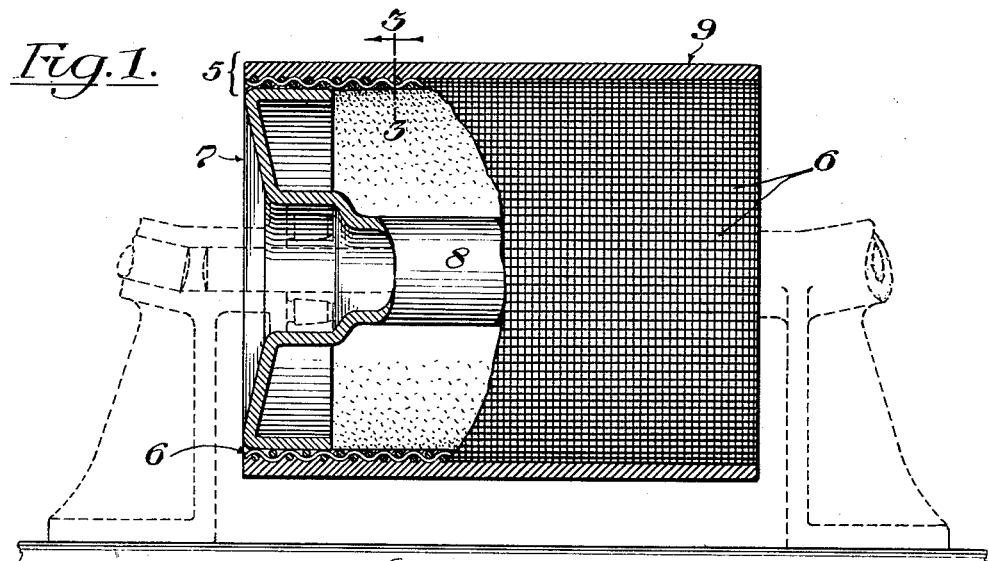
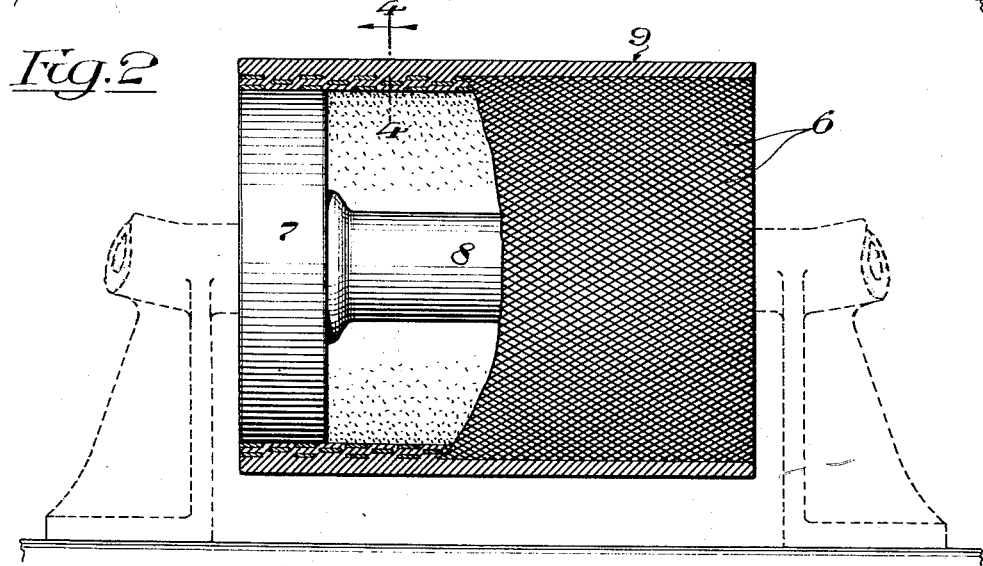
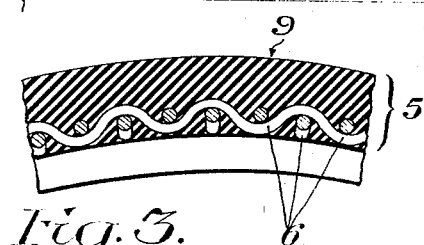
Inventor
Thomas Robins
by his Attorney
John R. Nolan Patented May 5, 1931

1,803,357

UNITED STATES PATENT OFFICE

THOMAS ROBINS, OF NEW YORK, N. Y., ASSIGNOR TO ROBINS CONVEYING BELT COMPANY, OF PASSAIC, NEW JERSEY, A CORPORATION OF NEW JERSEY

PULLEY

Application filed January 26, 1929. Serial No. 335,272.

This invention relates to pulleys, and more particularly to idler pulleys for conveyer belts.

The most common form of idler pulley is made of cast iron. It has two objectionable features, viz.: its great weight and its high cost, owing to the large amount of metal therein, and to the expansive machine work required mainly in facing the periphery or rim of the pulley. With the view of overcoming these objections pulleys have been made of pressed, rolled and drawn steel, but while such materials are relatively light, they rust quickly and they do not withstand abrasion.

The object of my invention is to provide a pulley of simple and efficient construction that will possess the merits of lightness and low cost, that will withstand abrasion and corrosion, and will also present a resilient surface having the capacity of absorbing shocks and reducing their effect on the associated belt and the pulley structure and supports.

To this end, my invention, generally stated, comprises a pulley having a rim of stout woven wire, expanded metal, or other foraminated material of adequate strength, covered throughout its periphery with soft rubber or other suitable tough and resilient material, as will be hereinafter described and claimed.

In the drawings—

Figure 1 is a sectional elevation of an idler pulley embodying my invention.

Fig. 2 is a similar view of a modication.

Figs. 3 and 4 are transverse sections, enlarged, through the pulley rim, as on the lines 3—3 and 4—4 of Figs. 1 and 2, respectively.

Referring to the drawings, 5 designates a pulley rim comprising a cylindrical structure of foraminated metal 6, having elements which extend back and forth such, for example, as the strands of stout woven wire, as represented in Figs. 1 and 3, or the interconnecting elements of expanded sheet metal, as represented in Figs. 2 and 4, which rim is illustrated in the present instance as supported on circular end heads 7 connected by a central tube 8 adapted to receive the shaft or axle of the pulley. The foraminated metal structure, though relatively light, possesses adequate strength for its intended purpose, while the portions of the elements in contact with the heads will grip the heads and retain the rim in position on the heads.

This structure is provided with a homogeneous covering 9 of rubber, or other suitable tough resilient material, which is embedded in the meshes or openings between the various elements of the structure, and between portions of the elements and the peripheries of the heads, thus firmly anchoring the elements to each other and to the heads, as illustrated. The covering, which is of substantial thickness, effectually withstands the abrasive action thereon of hard substances, particularly when the pulley is used in connection with conveyor belt systems; it absorbs the resulting shocks, reducing their effect on the associated belt and the pulley structure and supports; it shields and protects the metal structure from the injurious influence of moisture and acids; it presents to the belt an effective frictional contact surface, and, finally, it can be produced at low cost compared with that of a cast-iron pulley, as previously mentioned.

I claim—

1. A pulley comprising a rim support, a rim formed of foraminated metal having elements which extend back and forth with portions in contact with the support and a tough resilient covering for the foraminated metal filling the spaces between the various elements and between portions of some of said elements and the support.

2. A pulley comprising end heads, a connecting member between the heads, a rim formed of foraminated metal having elements which extend back and forth with portions in contact with the heads and a tough resilient covering for the foraminated metal filling the spaces between the various elements and between portions of some of said elements and the heads.

3. A pulley comprising a hollow cylindrical structure of stout woven-wire, and a peripheral covering therefor of soft rubber embedded and anchored in the meshes of the wire.

Signed at New York in the county and State of New York this 23d day of January, A. D. 1929.

THOMAS ROBINS.